United States Patent [19]

Valpey, III et al.

[11] Patent Number: 5,418,307

[45] Date of Patent: May 23, 1995

[54] HYDROGENATED POLYMERS HAVING ACID FUNCTIONALITY

[75] Inventors: Richard S. Valpey, III, Matteson; Mohamad D. Shalati, Homewood; Rodney M. Harris, Chicago, all of Ill.

[73] Assignee: The Sherwin-Williams Company, Cleveland, Ohio

[21] Appl. No.: 176,174

[22] Filed: Jan. 3, 1994

[51] Int. Cl.6 .......................................... C08F 220/18
[52] U.S. Cl. .................................. 526/329.1; 526/72; 526/89; 526/266; 526/271; 526/308; 526/335; 526/340.1; 524/455; 524/460; 524/475; 524/543; 524/599; 525/55; 525/221; 525/232; 428/357
[58] Field of Search ................... 526/72, 89, 266, 271, 526/308, 329.1, 335, 340.1; 524/599, 455, 460, 475, 543; 525/55, 221, 232; 428/357

[56] References Cited

U.S. PATENT DOCUMENTS

| | | | |
|---|---|---|---|
| 2,884,408 | 4/1959 | Phillips et al. | 528/361 |
| 3,523,143 | 8/1970 | Kwong | 525/532 |
| 3,975,314 | 8/1976 | Smyk et al. | 525/117 |
| 4,107,114 | 8/1978 | Nakayama et al. | 424/812 |
| 4,703,101 | 10/1987 | Singer et al. | 528/87 |
| 4,859,758 | 8/1989 | Shalati et al. | 527/313 |
| 4,871,806 | 10/1989 | Shalati et al. | 525/108 |
| 4,927,868 | 5/1990 | Schimmel et al. | 523/439 |
| 5,093,391 | 3/1992 | Barsotti et al. | 523/400 |
| 5,227,243 | 7/1993 | Shalati et al. | 428/457 |

*Primary Examiner*—Samuel A. Acquah
*Attorney, Agent, or Firm*—Robert E. McDonald; Steven W. Tan; Heidi A. Boehlefeld

[57] ABSTRACT

An acid-functional polymer is obtained by the hydrolysis or half-ester ring opening reaction of an anhydride-functional polymer obtained by at least partially hydrogenating an unsaturated polymer which was obtained by reacting under ene reaction conditions:

(i) an unsaturated anhydride having the structure:

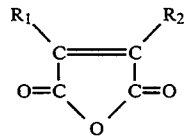

wherein $R_1$ and $R_2$ are each independently hydrogen, alkyl of 1 to about 6 carbons, or alkoxy of 1 to about 6 carbons, or a halogen; and (ii) at least one polyolefin having at least two carbon-carbon double bonds in the polyolefin backbone and having an average of at least three carbon atoms in the polyolefin backbone between the carbon-carbon double bonds.

14 Claims, No Drawings

HYDROGENATED POLYMERS HAVING ACID FUNCTIONALITY

BACKGROUND OF THE INVENTION

1. Field of the Invention

This invention relates to acid-functional polymers obtained by the ring opening half-ester reaction, or the hydrolysis, of specified anhydride-functional polymers. The anhydride-functional polymers which are used to prepare the acid-functional polymers are obtained by at least partially hydrogenating an unsaturated polymer which was, in turn, obtained by reacting, under ene reaction conditions, (i) an unsaturated anhydride having the structure:

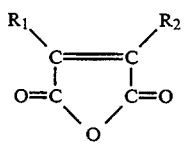

wherein $R_1$ and $R_2$ are each independently hydrogen, alkyl of 1 to about 6 carbons, or alkoxy of 1 to about 6 carbons, or a halogen; and (ii) at least one polyolefin having at least two carbon-carbon double bonds in the polyolefin backbone and having an average of at least three carbon atoms in the polyolefin backbone between the carbon-carbon double bonds.

The polyolefin which is reacted under ene reaction conditions with the unsaturated anhydride will have an average of at least three carbon atoms in the backbone between the carbon-carbon double bonds. The backbone of such a polyolefin would be comprised primarily of repeating units having the structure:

wherein each x is individually a number from 2 to about 15; and $R_3$, $R_4$ and $R_5$ are each individually hydrogen, or a linear, branched or cyclic aliphatic group of 1 to about 18 carbon atoms. By "primarily" is meant that at least 60% by weight, and preferably at least 90% by weight, of the repeating backbone units of the polyolefin would have that structure.

The preferred polyolefin has the structure:

wherein each x, $R_3$, $R_4$ and $R_5$ is as defined above; each Z is individually hydrogen, or a linear, branched, or cyclic aliphatic group of 1 to about 36 carbons; and n is a number between 2 and 5,000.

Between 1% and 100%, and preferably between 20% and 95% of the carbon-carbon double bonds of the unsaturated polymer obtained by the ene reaction will be hydrogenated to produce the hydrogenated anhydride-functional polymers which are subsequently converted to the acid-functional polymers. The hydrogenated anhydride-functional polymers should have an average of at least two anhydride groups per molecule. As used herein, the term "hydrogenated anhydride-functional polymer" means a polymer in which at least 1% of the carbon-carbon double bonds have been hydrogenated.

The acid-functional polymers obtained from the hydrogenated anhydride-functional polymers should have an average of at least two carboxylic acid groups per molecule and are useful as corrosion or scale inhibitors, thickeners, dispersants and as reactive agents and/or crosslinking agents for compounds having an average per molecule of at least two functional groups, such as epoxy, hydroxyl or amine groups, which are reactive with acid groups. The acid-functional polymers can, therefore, be utilized in a variety of materials such as plastics, fibers, adhesives, paper sizing, inks and, particularly, coating compositions.

This invention also relates to novel reactive compositions which utilize the acid-functional polymer in combination with one or more other materials which can react with acid groups. These reactive compositions can be reacted at room temperature or force dried at temperatures ranging up to about 350° F. or higher if desired. When utilized as reactive crosslinking agents for coatings, the acid-functional polymers may be utilized in a variety of coating applications, including primers and topcoats as well as clearcoats and/or basecoats in clearcoat/basecoat compositions.

The reactive compositions typically involve the combination of the acid-functional polymer with an epoxy-functional compound. The reactive composition may, optionally, also incorporate an anhydride-functional compound and, optionally, also a hydroxyl-functional compound. All of these combinations can provide fast reacting, durable coatings which minimize the toxicity problems which may be associated with other low temperature curing systems.

2. Description of the Prior Art

Unsaturated, polymerizable acids, such as maleic acid, acrylic acid, methacrylic acid and polymers or copolymers incorporating these materials are known in the art. By the selection of one or more of these acids, polymers may be tailored to provide a desired acid value, reactivity or other desired property. The prior art has not, however, taught polymers obtained by the half-ester reaction or the hydrolysis of the anhydride-functional polymers taught herein.

Coating compositions comprising reactive combinations of epoxy-containing compounds and compounds having acid functionality are known in the art. For example, U.S. Pat. No. 4,107,114 teaches the ene reaction of maleic anhydride and unsaturated polyolefins such as polypentadiene. The resultant anhydride-functional polymer can be subjected to a ring cleavage reaction to produce an acid-functional polymer. Additionally, U.S. Pat. No. 4,859,758 teaches an acid-functional cellulose ester based polymer which could be used in combination with a polyepoxide, and optionally, a polyanhydride and, optionally a hydroxy-functional compound. Similarly, coating compositions comprising cyclic anhydrides and hydroxy-functional compounds are also known in the art. The prior art has not, however, taught the novel acid-functional polymers of this invention nor has it taught coating compositions comprising these acid-functional polymers with epoxy-functional compounds and, optionally, anhydride-functional compounds, and, optionally, hydroxy-functional compounds to provide low temperature curing coatings having excellent durability and performance.

BRIEF SUMMARY OF THE INVENTION

This invention involves acid-functional polymers obtained by the hydrolysis or by the ring opening half-ester, half-amide or other ring opening reaction of the defined anhydride-functional polymer. The acid-functional polymers will normally have an average of at least 2.0, and preferably at least 2.1 acid groups per polymer molecule.

This invention also relates to curable coating compositions comprising the acid-functional polymer and an epoxy-functional compound, optionally also in combination with other reactive materials such as an anhydride-functional compound. If desired, in addition to the anhydride-functional compound, hydroxy-functional compounds reactive with the anhydrides can be added as well. The term "compound" is used in its broadest sense to include monomers, oligomers and polymers. This invention also relates to substrates coated with the coating compositions of this invention.

In the most preferred coating formulations the epoxy-functional compound is a polyepoxide having an average of at least two epoxy groups, especially cycloaliphatic epoxy groups, per molecule.

It is especially preferred to utilize the curable coating compositions of this invention in combination with about 5 to about 80% by weight of the total coating composition of an inert solvent. It is convenient to provide tile coating composition as a multicomponent system which is reactive upon mixing the components. Especially preferred is a two-component system wherein the acid-functional polymer, and, if utilized, the anhydride-functional compound are combined in one package and the epoxy-functional compound and, if utilized, the hydroxy-functional compound provide a second package. The two packages can then be mixed together to provide the curable coatings immediately prior to application.

In one preferred application, this invention relates to coated substrates having a multi-layer decorative and-/or protective coating which comprises:
(a) a basecoat comprising a pigmented film-forming polymer; and
(b) a transparent clearcoat comprising a film-forming polymer applied to the surface of the basecoat composition;
wherein the clearcoat and/or the basecoat comprises the curable coating compositions of this invention. The term "film-forming polymer" means any polymeric material that can form a film from evaporation of any carrier or solvent.

Accordingly, it is an object of this invention to provide novel acid-functional polymers. Another object is to provide improved curable compositions having excellent reactivity at low temperatures. It is a further object of this invention to provide coating compositions which may be utilized as primers, topcoats or clearcoats and/or basecoats in clearcoat/basecoat compositions. Another object of this invention is to provide an improved coating composition comprising the acid-functional polymer and an epoxy-functional compound and, optionally, an anhydride-functional compound, and, optionally, a hydroxy-functional compound. Another object of this invention is to provide coatings having excellent reactivity, durability and corrosion resistance. A further object of this invention is to provide improved coating compositions which can be cured at room temperature or force dried at elevated temperatures. Another object is to provide curable compositions that are relatively low in viscosity and which can be utilized with reduced amounts of volatile organic solvents. These and other objects of the invention will become apparent from the following discussions.

DETAILED DESCRIPTION OF THE INVENTION

1. ACID-FUNCTIONAL POLYMERS

The acid-functional polymers are prepared by the ring opening half-ester reaction, or the hydrolysis of the defined anhydride-functional polymer. The half-ester ring opening reaction can be conducted by admixing the anhydride-functional polymer and a monoalcohol, optionally, in the presence of a suitable solvent such as an aromatic hydrocarbon, an ester, a ketone or other solvent which is not reactive with anhydride groups. The relative concentrations of the anhydride polymer and the monoalcohol can be adjusted to provide any desired degree of acid functionality in the final polymer. Typically, at least 0.1 equivalents of alcohol will be provided for each equivalent of anhydride. Preferably about 0.3 to about 1.0 equivalents of alcohol will be provided for each equivalent of anhydride. The half-ester reaction should be conducted at a temperature low enough to minimize or prevent any reaction of the acid groups and the hydroxyl groups. Typically, the reaction will be conducted between 25° C. and 150° C., and preferably between 25° C. and 75° C. and can be conducted in the presence of a suitable catalyst such as an organic or inorganic acid or a tertiary amine.

The hydrolysis can typically be conducted by admixing the anhydride-functional polymer, water and, optionally, a suitable catalyst such as an organic or inorganic acid or a tertiary amine such as N-methyl imidazole. The catalyst will typically be present at a level of at least about 0.1% by weight of the anhydride-functional polymer. The reaction is typically maintained at 20° C. to about 100° C. during the hydrolysis. At least 0.1 equivalents of water will typically be utilized for each equivalent of anhydride, and preferably 0.3 to about 3.0 equivalents of water will be utilized for each equivalent of anhydride.

When the number of equivalents of alcohol or water reacted with the anhydride-functional polymer is less than the total equivalents of anhydride, the resultant polymer will have both acid and anhydride functionality.

The anhydride-functional unsaturated polymers which are subsequently reacted with water or an alcohol to produce the acid-functional polymers of this invention are prepared by at least partially hydrogenating an anhydride-functional unsaturated polymer which was, in turn, obtained by the ene reaction of a specified polyolefin and an unsaturated anhydride. The ene reaction is a well known synthetic reaction in which an olefin having an allylic hydrogen reacts thermally with an eneophile with formation of a new sigma-bond to a carbon atom, migration of the allylic hydrogen to the eneophile, and a change in the position of the double bond of the olefin. For example, the ene reaction between maleic anhydride and a linear polyolefin obtained by the metathesis of cyclooctene would proceed in an idealized, representative fashion as follows:

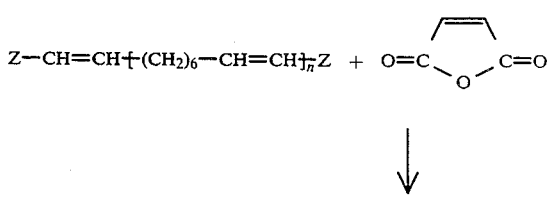

-continued

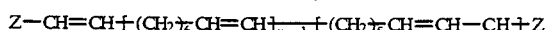

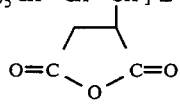

Since double bonds are not eliminated, but are merely shifted in the polyolefin, additional ene reactions can take place at the new location of the double bond, and since the ene reaction can take place at either carbon of the olefin double bond, there will be differing numbers of carbon atoms between the double bonds on the polymer backbone. Depending on the stoichiometry employed, there may be unreacted olefinic segments interspersed among the repeating units having pendent succinic anhydride groups. If greater than one molar equivalent of unsaturated anhydride per olefin repeating unit is used, some of the olefin repeating units will contain more than one anhydride segment.

Representative discussions of olefin metathesis to produce polyolefin polymers are given in Irvin, K. J. in *Olefin Metathesis*, Academic Press, London, 1983; by Grubbs, R. H. in *Comprehensive Organometallic Chemistry*, Wilkinson, G. et al. (Eds), Vol 8, Pergamon New York (1982); by Dragutan, V. et al., *Olefin Metathesis and Ring-Opening Polymerization of Cyclo-Olefins*, 2nd Ed., Wiley Interscience, New York (1985); and by Leconte, M. et al. in *Reactions of Coordinated Ligands*, Braterman, P. R. (Ed.), Plenum New York (1986).

Representative unsaturated anhydrides which are useful in the practice of this invention include maleic anhydride, chloromaleic anhydride, itaconic anhydride, citraconic anhydride, methoxymaleic anhydride, ethylmaleic anhydride, etc. Maleic anhydride is especially preferred due to its relatively low cost and availability.

The preferred polyolefins which are useful in the practice of this invention have the structure:

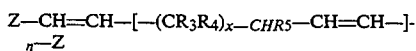

Polyolefins having repeating units wherein x is less than 2, e.g. polybutadiene, are not useful because high levels of anhydride incorporation, e.g. more than about 15% by weight, leads to very high viscosities. Especially preferred polyolefins are those wherein x is between 4 and 12. Polyolefins wherein n is greater than 5 are generally preferred because they have a sufficient number of double bonds for convenient incorporation of relatively high levels of anhydride. Particularly preferred polyolefins are those wherein n is between 2 and 100 and especially between 8 and 28. Especially preferred polyolefins are those wherein $R_3$, $R_4$ and $R_5$ are all hydrogen.

Polyolefins which are especially useful in the practice of this invention can be prepared by the olefin metathesis of cyclic olefins, typically by a linear olefin. Metathesis of cyclic olefins with themselves or other cyclic olefins produces larger cyclic olefins. Metathesis of cyclic olefins with non-cyclic olefins produces ring opened, linear polymeric olefins. For example, metathesis of a mixture of cyclooctene and small amounts of vinyl cyclohexane in the presence of a metathesis catalyst yields polyoctenemers possessing methylene and/or cyclohexane end groups. The ratio of vinyl cyclohexane to cyclooctene, catalyst selection and level and reaction temperature controls molecular weight. One such idealized reaction is shown below:

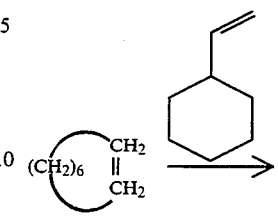

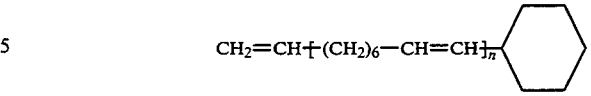

Polyolefins having different alkyl chains between unsaturation sites can be prepared by the metathesis of cyclic olefin monomers of various sizes. For example, a similar metathesis of cycloheptene would produce idealized repeating units of

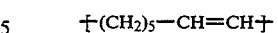

and a similar metathesis of cyclopentene would produce idealized repeating units of

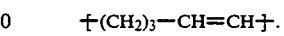

Other cyclic olefins which are practical for preparing the polyolefins useful in this invention include, cyclohexene, cyclononene, cyclodecene, cycloundecene, cyclododecene and norbornene. If desired, mixtures of cyclic olefins can be used to prepare the polyolefin.

The preparation of polymeric olefins can thus be achieved through metathesis. Successive metathesis reactions of cyclic olefins terminated by the metathesis reaction with a linear olefin furnishes linear polymers having multiple unsaturation sites. Polyoctenemers referred to under the trade name "Vestenamers" were available from Huls Aktiengesellschaft, Marl, Germany.

The metathesis reaction is typically conducted at temperatures ranging from 0° C. to about 120° C. Useful molecular weight ranges for the defined polyolefins useful in this invention can be obtained by the metathesis of a cyclic olefin and a non-cyclic olefin in molar ratios ranging from about 2–1 to 5000–1.

Metathesis catalysts are well known in the art and representative examples include the halides, oxyhalides and oxides of tungsten, molybdenum and tantalum. Suitable metathesis catalysts are tungsten hexachloride, tungsten oxytetrachloride, tungsten oxide, tridodecylammonium tungstate, tri(tridecyl)ammonium tungstate, trioctylammonium tungstate, molybdenum pentachloride, molybdenumoxytrichloride, acetylacetonatomolybdenumoxide, tridodecylammonium molybdate, trioctylammonium molybdate and tantalum pentachloride. One suitable catalyst for the metathesis reaction, described by Calderon, et al. in *Advances in Organometallic Chemistry* 1979 17, 479, is prepared by mixing tungsten hexachloride, ethylaluminum chloride and ethanol under a nitrogen atmosphere. The metathesis catalyst is typically present at a level of at least 0.01 parts for each 100 parts by weight of monomers.

Another process to produce the defined polyolefins of this invention is by molecular weight reduction of high molecular weight polymers as taught by K. W. Scott, N. Calderon, E. A. Ofstead, W. A. Judy and J. P. Ward, *Adv. Chem. Set.* 1969 91,399. This process, which is similar to the previously described production of ring opened polyolefins, is accomplished by adding a low molecular weight olefin such as ethylene or butene to a high molecular weight cycloalkene in the presence of a metathesis catalyst.

As used herein the term "ene reaction conditions" means reaction conditions sufficient to cause the desired degree of ene reaction between the unsaturated anhydride and the unsaturated hydrocarbon.

The ene reaction for producing the anhydride-functional unsaturated polymers which are subsequently hydrogenated and converted to acid-functional polymers in the practice of this invention, is conducted by admixing an unsaturated anhydride, such as maleic anhydride or a substituted maleic anhydride, with the specified polyolefins and maintaining the reaction at 140° C. to 300° C., and preferably 160° C. to 200° C., until the desired degree of reaction is obtained. The reaction proceeds in very high yields and virtually all of the anhydride is typically incorporated. Remaining unreacted anhydride, if any, can be, if desired, removed by vacuum distillation or other suitable method, The ene reaction can be conducted, if desired, in the presence of an inert solvent such as xylene, toluene, methyl amyl ketone, ethylene glycol monobutyl ether acetate, etc., or, if the reactant mixture is liquid at the reaction temperature, the ene reaction can be conducted without solvent. The anhydride and polyolefin can be mixed in virtually any ratio to provide any desired degree of anhydride functionality in the final polymer. Typically, the mixture will comprise 1% to about 70%, and especially 15% to about 45% anhydride by weight and the remaining 30% to 99%, and especially 85% to 55% by weight being the polyolefin.

Because the ene reaction does not eliminate double bonds, but merely shifts them in the polyolefin, the anhydride-functional polymer produced by the ene reaction will still maintain essentially the same number of double bonds as the starting polyolefin. These carbon-carbon double bonds can be conveniently hydrogenated by any of the methods well known in the art. The most convenient preparation involves the high pressure hydrogenation of the anhydride-functional ene reaction product by exposing the unsaturated polymer to hydrogen gas in the presence of a suitable catalyst such as nickel, platinum, paladium or Raney nickel. One preferred preparation of Raney nickel catalyst is that set forth by R. Mozingo in *Org. Syn. Coil.* Vol. 3, 1955, 181. The hydrogenation reaction is typically conducted at temperatures ranging from about 30° C. to 85° C. in a reaction vessel which can withstand high pressures. The extent of reaction can be monitored by determining the amount of hydrogen gas which has been reacted, or by obtaining a liquid sample and measuring the Iodine Number to determine the number of double bonds remaining. It is only necessary for purposes of this invention that the hydrogenation be conducted to the extent necessary to provide the desired amount of saturation into the unsaturated anhydride-functional polymer. Typically, the hydrogenation catalyst will be present in an amount of at least 0.1 percent, and generally will be 0.5 percent to about 4.0 percent by weight of the unsaturated polymer. Although it is generally more convenient to hydrogenate the anhydride-functional unsaturated polymer first, followed by conversion of the anhydride groups to acid groups, it is also possible to convert the anhydride groups to acid groups first and then hydrogenate that unsaturated polymer.

2. REACTIVE COATING COMPOSITIONS

The novel acid-functional polymers of this invention can be combined with other compounds which are reactive with acid functionality to produce reactive coating compositions. These reactive coating compositions typically could comprise:

(i) the acid-functional polymer and a polyepoxide;

(ii) the acid-functional polymer, a polyanhydride and a monoepoxide or polyepoxide; or (iii) the acid-functional polymer, a polyanhydride, a mono- or polyepoxide, and a hydroxy-functional compound.

2.A. EPOXY-FUNCTIONAL COMPOUNDS

The reactive compositions of this invention typically require the use of at least one epoxy-functional compound, especially if room temperature or low temperature cures are desired. The epoxy compound, preferably, will be a polyepoxide having an average of at least two epoxy groups per molecule. If the acid-functional polymer of this invention is used in combination with an anhydride-functional compound and, optionally a hydroxy-functional compound, then either a monoepoxide or a polyepoxide can be used.

Representative useful monoepoxides include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid (commercially available as CARDURA® E from Shell Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used,. Additionally, epoxidized oils having an average of one epoxy group per molecule could also be used as monoepoxides.

Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

It is only necessary that the monoepoxide compounds have a sufficiently low volatility to remain in the coating composition under the applicable conditions of cure.

Polyepoxides are especially preferred in the reactive coatings of this invention. Especially preferred as the poly-functional epoxy compounds, due to their reactivity and durability, are the polyepoxy-functional cycloaliphatic epoxies. Preferably, the cycloaliphatic epoxies will have a number average molecular weight less than about 2,000 to minimize the viscosity. The cycloaliphatic epoxies are conveniently prepared by methods well known in the art such as epoxidation of dienes or polyenes, or the epoxidation of unsaturated esters by reaction with a peracid such as peracetic and/or performic acid.

Commercial examples of representative preferred cycloaliphatic epoxies include 3,4-epoxycyclohexylmethyl 3,4-epoxy cyclohexane carboxylate (e.g. "ERL-4221" from Union Carbide Corp.); bis(3,4-epoxycyclohexylmethyl)adipate (e.g. "ERL-4299" from Union Carbide Corporation); 3,4-epoxy-6-methylcyclohexylmethyl 3,4-epoxy-6-methylcyclohexane carboxylate (e.g. "ERL-4201" from Union Carbide Corp.); bis(3,4-epoxy-6-methylcyclohexylmethyl)adipate (e.g. "ERL-4289" from Union Carbide Corp.); bis(2,3-epoxycyclopentyl) ether (e.g. "ERL-0400" from Union Carbide Corp.); dipentene dioxide (e.g. "ERL-4269"from Union Carbide Corp.); 2-(3,4-epoxycyclohexyl-5,5-spiro-3-4-epoxy) cyclohexane-metadioxane (e.g. "ERL-4234" from Union Carbide Corp.). Other commercially available cycloaliphatic epoxies are available from Ciba-Geigy Corporation such as CY 192, a cycloaliphatic diglycidyl ester epoxy resin having an epoxy equivalent weight of about 154. The manufacture of representative cycloaliphatic epoxies is taught in various patents including U.S. Pat. No. 2,750,395; 2,884,408; 2,890,194; 3,027,357 and 3,318,822.

Other polyepoxides potentially useful in the practices of this invention include aliphatic and aromatic polyepoxies, such as those prepared by the reaction of an aliphatic polyol or polyhydric phenol and an epihalohydrin. Other useful epoxies include epoxidized oils and acrylic polymers derived from ethylenically unsaturated epoxy-functional monomers such as glycidyl acrylate or glycidyl methacrylate in combination with other copolymerizable monomers such as the (meth)acrylic and other unsaturated monomers. Representative useful (meth)acrylic monomers include methyl acrylate, ethyl acrylate, propyl acrylate, isopropyl acrylate, butyl acrylate, isobutyl acrylate, ethyl hexyl acrylate, amyl acrylate, 3,5,5-trimethylhexyl acrylate, methyl methacrylate, lauryl methacrylate, butyl methacrylate, acrylonitrile, methacrylonitrile, acrylamide and methacrylamide. Other copolymerizable monomers include vinyl acetate, vinyl propionate, vinyl butyrate, vinyl isobutyrate, vinyl benzoate, vinyl m-chlorobenzoate, vinyl p-methoxy benzoate, vinyl chloride, styrene, α-methyl styrene, diethyl fumarate, dimethyl maleate, etc. Monomers having acid functionality, or other functionality reactive with epoxide groups should normally not be utilized in the manufacture of the polyepoxide vehicle. It is often desirable to utilize epoxy-functional compounds which are free of hydroxyl groups.

The ratio of acid groups to epoxy groups can be widely varied to give any desired level of crosslinking within the practice of this invention. When the reactive coating system comprises just the acid-functional polymer and a polyepoxide, at least 0.1 acid groups should be present for each epoxy group. It is generally preferred, however, to provide about 0.1 to about 2.0 acid groups for each epoxy group in such a reactive system, and especially preferred to provide about 0.3 to about 1.0 acid groups for each epoxy group in such a system.

It is especially preferred in the practice of this invention to include a catalyst for the reaction of epoxy and acid groups. Tertiary amines, secondary amines such as ethyl imidazole, quaternary ammonium salts, and nucleophilic catalysts such as lithium iodide, phosphonium salts, and phosphines such as triphenyl phosphine are especially useful as catalysts for epoxy/acid reactions. The catalyst for the epoxy/acid reaction will typically be present at a level of at least 0.01% by weight of the total acid-functional polymer and epoxy-functional compound and will preferably be present at about 0.1 to about 3.0%.

2.B. ANHYDRIDE FUNCTIONAL COMPOUNDS

Useful reactive coating compositions incorporating the acid-functional polymer of this invention and an epoxy-functional compound may, optionally, also incorporate an anhydride-functional compound to alter various performance properties of the final coating. The anhydride-functional compounds which are useful in the practice of this invention can be any aliphatic or aromatic compound having at least two cyclic carboxylic acid anhydride groups in the molecule. Polymeric anhydrides having number average molecular weights between 500 and 7,000 are most useful. Especially preferred in the practice of this invention is the use of acrylic polymers having anhydride functionality. These are conveniently prepared as is well known in the art by the polymerization under free radical addition polymerization conditions of at least one unsaturated monomer having anhydride functionality, such as maleic anhydride, citraconic anhydride, itaconic anhydride, propenyl succinic anhydride, etc. optionally with other ethylenically unsaturated monomers such as the esters of unsaturated acids, vinyl compounds, styrene-based materials, allyl compounds and other copolymerizable monomers, all as representatively taught elsewhere in this specification.

The monomers which are copolymerized with the unsaturated anhydride monomer should, of course, be free of any functionality which could react with the anhydride group during the polymerization. These anhydride-functional polymers can be conveniently prepared by conventional free radical addition polymerization techniques. Typically the polymerization will be conducted in an inert solvent and in the presence of an initiator at temperatures ranging from 35 ° C. to about 200° C. The anhydride-functional free radical addition polymers should typically comprise at least 5% by weight of the anhydride. An especially preferred anhydride-functional polymer comprises the free radical addition polymerization product of (a) 5 to 40, and especially 15 to about 25, weight percent of an ethylenically unsaturated monoanhydride and (b) 60 to 95, and especially 75 to about 85, weight percent of at least one other ethylenically unsaturated monomer copolymerizable with the ethylenically unsaturated anhydride.

The ene reaction anhydride-functional polymers used to produce the acid-functional polymers of this invention, either with or without any hydrogenation, could also be used as the optional anhydride-functional polymer in the reactive compositions taught herein.

Other polyanhydrides can also be optionally utilized in the practice of this invention. Ester anhydrides can be prepared, as is known in the art, by the reaction of e.g. trimellitic anhydride with polyols. Other representative, suitable polyanhydrides include poly-functional cyclic dianhydrides such as cyclopentane tetracarboxylic acid dianhydride, diphenyl-ether tetracarboxylic acid dianhydride, 1,2,3,4,-butane tetracarboxylic acid dianhydride, and the benzophenone tetracarboxylic dianhydrides such as 3,3',4,4'-benzophenone tetracarboxylic dianhydride, and 2,bromo-3,3',4,4'-benzophenone tetracarboxylic acid dianhydride. Trianhydrides such as the benzene and cyclohexene hexacarboxylic acid trianhydrides are also useful. Additionally, useful polyanhydrides can be prepared by the maleinization of polyunsaturated compounds such as unsaturated rubbers, unsaturated oils and unsaturated hydrocarbons.

Although it is not our intent to be bound by theory, it is believed that in the course of the curing reaction of the components of this invention, that at least some of the acid groups and epoxy groups react to produce ester groups and hydroxyl groups and that at least some of these hydroxyl groups are reacted with the anhydride groups to produce ester groups and additional acid groups. It is, therefore, especially preferred in the practice of this invention to include a catalyst for the reaction of anhydride groups and hydroxyl groups and also a catalyst for the reaction of epoxy and acid groups.

When the reactive coating composition incorporates a polyanhydride-functional compound along with the acid-functional polymer and the epoxy-functional compound, the ratios of anhydride to acid to epoxy groups can be widely varied to give any desired level of crosslinking within the practice of this invention. Typically, the polyanhydride should be present in an amount to provide at least about 0.01 anhydride groups for each epoxy group in the reactive coating. It is preferred, however, to provide about 0.3 to about 6.0 acid groups and about 0.6 to about 12.0 epoxy groups for each anhydride group in the reactive system. An especially preferred formulation range provides 2.0 to about 5.0 acid groups and 3.0 to about 8.0 epoxy groups for each anhydride group.

2. C. HYDROXY-FUNCTIONAL COMPOUNDS

If desired, the reactive coating compositions of this invention which comprise the acid-functional polymer, the epoxy-functional compound and the anhydride-functional compound can also incorporate a hydroxy-functional compound. The hydroxy-functional compounds which are useful in the practice of this invention have an average of at least two hydroxyl groups per molecule. Although low molecular weight diols and polyols such as propylene glycol, 1,6-hexanediol, triethanol amine, and pentaerythritol can be utilized in the practice of this invention, it is especially preferred to utilize polymeric hydroxy-functional compounds such as polyethers, polyesters, acrylics, polyurethanes, polycaprolactones, etc.

Preferably the hydroxy-functional polymer will have a number average molecular weight of at least about 400. Typical number average molecular weights will range from about 400 to about 30,000, and especially 1,000 to about 15,000. In order to provide the fastest rate of reaction during cure it is preferred in the practice of this invention to utilize hydroxy-functional compounds having predominantly, and preferably all, primary hydroxyl functionality.

Representative hydroxy-functional polymers include those described in Sections 2.C. 1 through 2.C.5 below:

2. C. 1. Polyether polyols are well known in the art and are conveniently prepared by the reaction of a diol or polyol with the corresponding alkylene oxide. These materials are commercially available and may be prepared by a known process such as, for example, the processes described in Encyclopedia of Chemical Technology, Volume 7, pages 257-262, published by Interscience Publishers, Inc., 1951; and in Kirk-Othmer Encyclopedia of Chemical Technology, Volume 18, pages 638-641, published by Wiley-International, 1982. Representative examples include the polypropylene ether glycols and polyethylene ether glycols such as those marketed as Niax ® Polyols from Union Carbide Corporation.

2.C.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

2.C.3. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

2.C.4. Other useful hydroxy-functional polymers can be prepared by the reaction of at least one polyol, such as those representatively described in Section 2.C.2 above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4', 4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

2.C.5. Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(a) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, dimethylaminoethyl methacrylate, isobornyl methacrylate, t-butyl methacrylate, ethyl tiglate, methyl crotonate, ethyl crotonate, etc.;

(b) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(c) styrene-based materials such as styrene, alpha-methyl styrene, alpha-ethyl styrene, alpha-bromo styrene, 2,6-dichlorostyrene, etc.;

(d) allyl compounds such as allyl chloride, allyl acetate, allyl benzoate, allyl methacrylate, etc.;

(e) other copolymerizable Unsaturated monomers such as acrylonitrile, methacrylonitrile, dimethyl maleate, isopropenyl acetate, isopropenyl isobutyrate, acrylamide, methacrylamide, and dienes such as 1,3-butadiene, etc.

The acrylics are conveniently prepared by conventional free radical addition polymerization techniques. Frequently, the polymerization will be catalyzed by conventional initiators known in the art to generate a free radical such as azobis(isobutyronitrile), cumene hydroperoxide, t-butyl perbenzoate, etc. Typically, the unsaturated monomers are heated in the presence of the free radical initiator at temperatures ranging from about 35° C. to about 200° C., and especially 100° C. to 160° C., to effect the polymerization. The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional acrylic polymers. An especially preferred hydroxy-functional polymer is the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

When the reactive coating system incorporates a hydroxy-functional compound along with the acid-functional polymer, the epoxy-functional compound, and polyanhydride compound, the relative levels of each of these reactive groups may also be widely varied within the practice of this invention. It is preferred, however, to provide about 0.05 to about 3.0 acid groups and about 0.5 to about 4.0 epoxy groups and about 0.5 to about 6.0 hydroxyl groups for each anhydride group in the reactive system. An especially preferred formulation range provides 1.0 to about 2.0 acid groups and 1.0 to about 3.0 epoxy groups and about 1.0 to about 4.0 hydroxyl groups for each anhydride group.

It is especially preferred in the practice of this invention when using anhydride-functional compounds in combination with the acid-functional polymers and epoxy-functional compounds to include a catalyst for the reaction of the epoxy and acid groups and a catalyst for the reaction of anhydride groups and hydroxyl groups as taught in this specification. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound and preferably 1.0 to about 5.0%.

If desired, more than one of any of the acid-functional, anhydride-functional, epoxy-functional or hydroxy-functional compounds could be utilized in a single curable coating formulation.

The coatings of this invention can be cured at temperatures ranging from about room temperature up to about 350° F. The coatings can be used as clear coatings and/or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

Since the curable compositions of this invention are typically provided as multi-package systems which must be mixed together prior to use, the pigments, catalysts and other additives can be conveniently added to any or all of the appropriate individual packages.

The coatings of this invention may typically be applied to any substrate such metal, plastic, wood, glass, synthetic fibers, etc. by brushing, dipping, roll coating, flow coating, spraying or other method conventionally employed in the coating industry.

One preferred application of the curable coatings of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters and unsaturated monomers for either type of polymer include methyl methacrylate, ethyl methacrylate, propyl methacrylate, butyl methacrylate, ethyl acrylate, butyl acrylate, vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a carbodiimide, a polyanhydride, a polyisocyanate, a polyepoxide, or a nitrogen resin such as a condensate of an aldehyde such as formaldehyde with a nitrogenous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain waxes, rheology modifiers, cellulose esters, or other additives to alter the appearance drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers or stabilizers, such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6, and especially about 0.5 to about 3.0 mils.

If desired, the novel reactive compositions taught herein could be used as a basecoat, in which case the clearcoat could also comprise the novel reactive coatings taught herein, or other polymers, including the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by-weight and "percent" is percent-by-weight. Examples 1 through 3 teach the preparation of representative anhydride-functional polymers.

EXAMPLE 1

An unsaturated anhydride-functional polymer was prepared by charging a reaction vessel equipped with a mechanical stirrer, condenser and temperature controlling device with 105.0 parts VESTENAMER® L-3000 (a soft, waxy polyolefin available from Huls Aktiengesellschaft, and which is derived from cyclooctene and which has a number average molecular weight of approximately 1,600, an iodine number of approximately 250 and has a composition comprising approximately 78% trans double bonds, 17% cis double bonds and 5% of the double bonds have a $CH_2$ group), 45.0 parts maleic anhydride and 6.25 parts xylene. The reaction mixture was heated to 200° C. over approximately 2 hours and 30 minutes and held at 200° C. for approximately 3 hours and 45 minutes at which point it was allowed to cool to 130° C. and 937.5 parts n-butyl acetate was added and the reaction mixture heated to reflux at 132° C. and held at that temperature for approximately 35 minutes. The unsaturated anhydride-functional polymeric product had an NVM of 60.8%, a measured iodine value of 166 and a density of 8.06 pounds per gallon.

The unsaturated anhydride-functional polymer was charged into a Parr Bomb to fill it about one-half full and approximately 1% by weight of the resin solids of Raney Nickel was added. The Bomb was purged with hydrogen and then heated to approximately 50° C. providing a pressure of approximately 100 psi for approximately eight hours. The hydrogenated product showed an iodine number of approximately 129.3 indicating approximately 22% of the unsaturation sites of the original polymer were hydrogenated.

EXAMPLE 2

In like manner to Example 1, an unsaturated anhydride-functional resin was prepared as the reaction product of 30 parts by weight maleic anhydride and 70 parts by weight VESTENAMER ® L-3000. The resultant polymer was hydrogenated in a Parr Bomb with Raney Nickel catalyst (approximately 1% based on resin solids) at 70° C. and 100 psi pressure of hydrogen to provide a final partially hydrogenated 5 product having approximately 14.3% of the double bonds hydrogenated.

EXAMPLE A

An acid-functional polymer can be prepared by the half-ester ring opening reaction by admixing the anhydride-functional polymers of Examples 1 or with a stoichiometrically equivalent amount of methanol and allowing the reaction mixture to remain at room temperature for approximately 18 hours.

EXAMPLE B

An acid-functional polymer can be prepared by hydrolysis of the anhydride-functional polymers of Examples 1 or by admixing the polymer with approximately a three-fold equivalent excess of water in a suitable solvent, such as tetrahydrofuran, and heating the mixture to approximately 100° C. for approximately 10 hours.

While this invention has been described by a specific number of embodiments, other variations and modifications may be made without departing from the spirit and scope of the invention as set forth in the appended claims.

The entire disclosures of all applications, patents and publications cited herein are hereby incorporated by reference.

The invention claimed is:

1. An acid-functional polymer obtained by the hydrolysis or half-ester ring opening reaction of an anhydride-functional polymer obtained by at least partially hydrogenating an unsaturated polymer which was obtained by reacting under ene reaction conditions a mixture of reactants comprising:
   (i) an unsaturated anhydride having the structure:

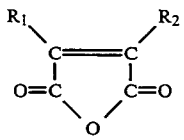

wherein $R_1$ and $R_2$ are each independently hydrogen, alkyl of 1 to about 6 carbons, or alkoxy of 1 to about 6 carbons, or a halogen; and
   (ii) at least one polyolefin having at least two carbon-carbon double bonds in the polyolefin backbone and having an average of at least three carbon atoms in the polyolefin backbone between the carbon-carbon double bonds.

2. The hydrogenated acid-functional polymer of claim 1 wherein the backbone of the polyolefin comprises repeating units having the structure:

wherein each x is individually a number from 2 to about 15; and $R_3$, $R_4$ and $R_5$ are each individually hydrogen, or a linear, branched or cyclic aliphatic group of 1 to about 18 carbon atoms.

3. The hydrogenated acid-functional polymer of claim 1 wherein the polyolefin comprises the structure:

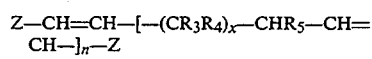

wherein each x is individually a number from 2 to about 15; $R_3$, $R_4$ and $R_5$ are each individually hydrogen, or a linear, branched or cyclic aliphatic group of 1 to about 18 carbon atoms; each Z is individually hydrogen or a linear, branched or cyclic aliphatic group of 1 to about 36 carbons; and n is a number between 2 and 5,000.

4. The acid-functional polymer of claim 3 wherein n is between 2 and 100.

5. The acid-functional polymer of claim 3 wherein n is between 8 and 28.

6. The acid-functional polymer of claim 1 wherein the unsaturated polymer is obtained by reacting under ene reaction conditions a mixture of reactants comprising:
   (i) 1% to 70% by weight of the unsaturated anhydride; and
   (ii) 99% to 30% by weight of the polyolefin.

7. The acid-functional polymer of claim 1 wherein the unsaturated polymer is obtained by reacting under ene reaction product of a mixture of reactants comprising:
   (i) 15 to 45 weight percent of the unsaturated anhydride; and
   (ii) 85 to 55 weight percent of the polyolefin.

8. The acid-functional polymer of claim 1 wherein the polyolefin is obtained by the metathesis of a cyclic olefin.

9. The acid-functional polymer of claim 8 wherein the cyclic olefin is cyclooctene.

10. The acid-functional polymer of claim 2 wherein x is between 4 and 12.

11. The acid-functional polymer of claim 2 wherein $R_3$, $R_4$ and $R_5$ are each hydrogen.

12. The acid-functional polymer of claim 1 wherein at least 1% of the carbon-carbon double bonds of the unsaturated polymer have been hydrogenated.

13. The acid-functional polymer of claim 1 wherein 20% to 95% of the carbon-carbon double bonds of the unsaturated polymer have been hydrogenated.

14. A process for preparing an acid-functional polymer which process comprises admixing:
   (a) water and/or a monofunctional alcohol; and
   (b) an anhydride-functional polymer obtained by at least partially hydrogenating an unsaturated polymer which was obtained by reacting, under ene reaction conditions:
   (i) an unsaturated anhydride having the structure:

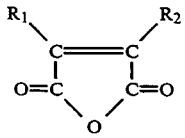

wherein $R_1$ and $R_2$ are each independently hydrogen, alkyl of 1 to about 6 carbons, or alkoxy of 1 to about 6 carbons, or a halogen; and (ii) at least one polyolefin having at least two carbon-carbon double bonds in the polyolefin backbone and having an average of at least three carbon atoms in the polyolefin backbone between the carbon-carbon double bonds.

* * * * *